UNITED STATES PATENT OFFICE.

N. KIEFFER, OF NEW ORLEANS, LOUISIANA.

IMPROVED MEDICINE.

Specification forming part of Letters Patent No. 58,106, dated September 18, 1866.

*To all whom it may concern:*

Be it known that I, N. KIEFFER, of New Orleans, in the Parish of Orleans and State of Louisiana, have invented a new and Improved Medical Compound; and I do hereby declare that the following is a full, clear, and exact description thereof, which will enable those skilled in the art to make and use the same.

The present invention relates to a new and improved medical compound or bitters which is in the form of a liquid.

This compound or bitters is composed of the following ingredients mixed together in or about the porportions named, and in a manner to be hereinafter explained: Four ounces lemon-peel, four ounces cinnamon, two ounces orange, two ounces galanga-root, two ounces calamus-root, two ounces angelica-root, two ounces zedoary, four ounces cloves, five ounces anise-green, two ounces anise-star, one pound coriander, one-half pound chamomile-flowers, one-fourth pound cassia buds or flowers, one pound juniper-berries, one-half pound gentian-root, one pound licorice-root, one-fourth pound laurel or bay berries, one pound caraway-seeds, one-half pound peppermint herb, two pounds burnt coffee, three pounds sugar, cooked or boiled to sirup, and twenty-five gallons of whisky.

Each herb above mentioned is first soaked or steeped for about forty-eight hours in natural spirit or alcohol, and then severally distilled in a copper alembic, after which the several products of distillation thus obtained are mixed together, and, being diluted with a sufficient quantity of water to render the compound palatable and potable, the three pounds of sugar previously cooked or reduced to a sirup is then added, by which the desired color is produced, and a compound or bitters obtained which, as a beverage, is most healthy, invigorating, and beneficial.

I claim as new and desire to secure by Letters Patent—

The medical compound composed of the ingredients herein named and mixed together in or about the proportions named.

The above specification of my invention signed by me this 30th day of May, 1866.

N. KIEFFER.

Witnesses:
JOHN HENRY GROTE,
J. GRAEFF.